United States Patent [19]

Morita et al.

[11] Patent Number: 5,417,217
[45] Date of Patent: May 23, 1995

[54] ECHO BEAM FORMER FOR AN ULTRASONIC DIAGNOSTIC APPARATUS

[75] Inventors: Dai Morita; Takeshi Motodani; Takao Higashiizumi, all of Tokyo, Japan

[73] Assignee: GE Yokogawa Medical Systems, Limited, Tokyo, Japan

[21] Appl. No.: 193,082
[22] PCT Filed: Aug. 19, 1992
[86] PCT No.: PCT/JP92/01049
   § 371 Date: Feb. 4, 1994
   § 102(e) Date: Feb. 4, 1994
[87] PCT Pub. No.: WO93/03675
   PCT Pub. Date: Mar. 4, 1993

[30] Foreign Application Priority Data

Aug. 20, 1991 [JP] Japan .................. 3-208053

[51] Int. Cl.⁶ .............................................. A61B 8/00
[52] U.S. Cl. .................. 128/661.01; 73/626
[58] Field of Search ........ 128/660.07, 661.01, 128/661.09; 73/625-626

[56] References Cited

U.S. PATENT DOCUMENTS 4,793,184 12/1988 Ikeda et al. ................ 73/626
4,974,558 12/1990 Katakura et al. ......... 128/661.01
5,129,399 7/1992 Hirama ........................ 128/661.01

FOREIGN PATENT DOCUMENTS 547786 1/1979 Japan .
5143476 11/1980 Japan .
8132677 8/1983 Japan .
1198535 8/1989 Japan .

Primary Examiner—Francis Jaworski
Attorney, Agent, or Firm—Moonray Kojima

[57] ABSTRACT

In an ultrasonic diagnostic apparatus which uses at least part of an array of a plurality of ultrasonic vibrators as an aperture for ultrasonic beam formation, sends ultrasonic waves into an object, receives echoes from the object, delays the output echo signals of a plurality of vibrators participating in receiving the echoes by a given quantity, adds up the delayed echo signals for echo beam forming, and forms a picture of an internal structure of the object by using the signals obtained by echo beam forming, the echo beam forming is characterized by forming a plurality of partial apertures in an aperture of an array of ultrasonic vibrators, delaying the echo signals provided by groups of vibrators included in the plurality of partial apertures by a given quantity determined so that a plurality of echo beams having a common focal point are formed, adding up the delayed echo signals of each group, detecting the respective sums of the delayed echo signals of the groups, and adding up the respective detected signals of the groups.

1 Claim, 5 Drawing Sheets

ECHO BEAM FORMER FOR AN ULTRASONIC DIAGNOSTIC APPARATUS

TECHNICAL FIELD

The present invention relates to an echo beam former for an ultrasonic diagnostic apparatus and, more particularly, to an echo beam former incorporating improvements for improving picture quality.

BACKGROUND ART

An ultrasonic diagnostic apparatus sends ultrasonic signals into an object by an ultrasonic probe, receives reflected ultrasonic signals reflected by the internal structure, such as a lesion, of the object by the ultrasonic probe and displays a tomographic picture formed by processing the reflected ultrasonic signals on a CRT for diagnosis.

Recently, an ultrasonic diagnostic apparatus capable of large-aperture transmission and reception to improve the picture quality of a B mode picture of a deep part of the object has been developed.

Large-aperture transmission and reception entails a remarkable change in the B mode picture due to irregular sonic velocity distribution in the organism, which will be described hereinafter with reference to FIG. 6 showing the ultrasonic receiver and associated components of a conventional ultrasonic diagnostic apparatus, in which the ultrasonic transmitter is omitted.

In FIG. 6, indicated at 1 is a probe which transmits and receives ultrasonic radiation and at 2 is a target in an object. An ultrasonic beam is applied to the target 2 and signals representing the reflected ultrasonic radiation are processed to display a picture of the target 2. The probe 1 has an array of a plurality of vibrators. An ultrasonic radiation receiving aperture is formed of $N+1$ vibrators among the array of vibrators. The value $N+1$ is, for example, 128; the 128 vibrators forms a large aperture.

Signals of $N+1$ channels, i.e., channels Nos. 0 to N, are amplified by $N+1$ preamplifiers 4, the amplified signals are delayed by a predetermined delay by a delay circuit 5 for phasing, and then an adder 6 adds the phased signals to provide the sum of phased signals. Beam forming conforming to a predetermined azimuth and/or focal point is achieved by such phasing and adding processes. The direction of the ultrasonic beam is changed sequentially to scan a desired region within the object.

A nonlinear amplifier 7 compresses and amplifiers the output of the adder 6, i.e., the phased and added signal, so that the dynamic range of the output of the adder 6 matches the dynamic range of the subsequent circuit. An envelop detector 8 detects the output of the nonlinear amplifier 7, an A/D converter 9 converts the output of the envelop detector 8 into a corresponding digital signal, a digital scan converter (DSC) 10 converts the digital signal into a corresponding signal of a television mode, and then a CRT 11 displays a picture represented by the output of the DSC 10.

Problems caused in the circuit shown in FIG. 6 by the probe 1 having a large aperture will be described with reference to FIG. 7, in which each of the delay circuit and the adder in a block A surrounded by alternate long and short dash lines in FIG. 6 is divided into two equal sections respectively for two sections of the aperture of the probe 1 demarcated by a center line. In FIG. 7, parts corresponding to those shown in FIG. 6 are denoted by the same reference characters. The delay circuit 5 is divided into a delay circuit A 12 and a delay circuit B 13, and the adder 6 is divided into an adder A 14 and an adder B 15 in the front half and an adder C 16 in the rear half. The adder C 16 adds the respective outputs of the adder A 14 and the adder B 15. The delay circuit A 12, the delay circuit B 13 and the adder A 14, the adder B 15 and the adder C 16 constitute an echo beam former 17. In this echo beam former 17, signals of the channels Nos. 0 to $\{(N+1)/2\}$ are applied to the delay circuit A 12, and signals of the $\{(N+1)/2\}$-th channels to N-th channels are applied to the delay circuit B 13.

The adder A 14 adds the output signals of the delay circuit A 12, and the adder B 15 adds the output signals of the delay circuit B 13. The adder C 16 adds the output a of the adder A 14 and the output b of the adder B 15 and provides an output c. The output c is the output signal of the echo beam former 17 obtained by phasing and adding all the signals of the channels Nos. 0 to N. The nonlinear amplifier 7 amplifies the output c of the adder C 16, and the envelop detector 8 detects the output of the nonlinear amplifier 7 to provide a signal d.

FIGS. 8(A) and 8(B) show the waveforms of the outputs a, b, c and d comparatively. Echoes from the target 2 having the waveforms shown in FIG. 8(A) are obtained when the distribution of sonic velocity on the paths of ultrasonic waves in the object is uniform, and echoes from the target 2 having the waveforms shown in FIG. 8(B) are obtained when the distribution of sonic velocity on the paths of ultrasonic waves in the object is irregular due to an adipose layer on the paths of ultrasonic waves in the object as shown in FIG. 6. In FIG. 8(A), since the distribution of sonic velocity is uniform, the waveform of the output a of the adder A 14 and that of the output b of the adder B 15 are in phase with each other and, consequently, the output c of the adder C 16 has the same waveform as those of the signals a and b, and an amplitude equal to the sum of those of the signals a and b. The output d of the envelop detector 8 represents information represented by the input signals a and b in a high fidelity. FIG. 8(B) shows the waveforms of the outputs a, b, c and d when the distribution of sonic velocity is irregular. The phase difference between the outputs a and b is about half the wavelength of the output b due to irregular sonic velocity distribution on the paths of ultrasonic waves. Consequently, the outputs a and b cancel each other, the output c, i.e., the sum of the outputs a and b, has an irregular waveform entirely different from those of the outputs a and b, and the output d of the envelop detector 8 has a waveform different from the natural waveform and does not represent the information about the target 2 correctly.

Such deformation of the output d is a kind of fading. As is obvious from FIGS. 8(A) and 8(B), the picture quality is greatly dependent on the mode of distribution of sonic velocity on the paths of ultrasonic waves between the probe 1 and the target 2. When a large aperture is used to detect the target in a high azimuth resolution, the probability of inclusion of a region that cause an irregular sonic velocity distribution and the adverse influence of fading increase with the increase of the size of the aperture.

DISCLOSURE OF THE INVENTION

The present invention has been made in view of the foregoing problems in the conventional echo beam former and it is therefore an object of the present invention to realize an echo beam former capable of providing signals representing a picture of a satisfactory picture quality even if a probe having a comparatively large aperture is used for sending ultrasonic radiation into and receiving ultrasonic echoes from a target in an object in which the distribution of sonic velocity is irregular.

In an ultrasonic diagnostic apparatus in accordance with the present invention solving the foregoing problems, using at least some of a plurality of ultrasonic vibrators arranged in an array as an aperture for forming an ultrasonic beam, applying ultrasonic radiation to an object, receiving ultrasonic echoes from the object, adding echo signals provided by a plurality of vibrators assigned to receiving the ultrasonic echoes after delaying the same by a predetermined quantity for echo beam forming, and forms an image of an internal structure of the object by using signals obtained by beam forming; the echo beam forming is characterized in that a plurality of partial apertures are formed in the aperture formed of the array of ultrasonic vibrators, echo signals provided by the vibrators of each partial aperture are delayed by a predetermined quantity so as to form a plurality of echo beams having a common focal point, the delayed echo signals of each partial aperture are added up to obtain an added echo signal, the added echo signal is detected to obtain a detected signal, and all the detected signals are added up.

BEST MODE FOR CARRYING OUT THE INVENTION

Preferred embodiments of the present invention will be described hereinafter with reference to the accompanying drawings.

Figure 1:
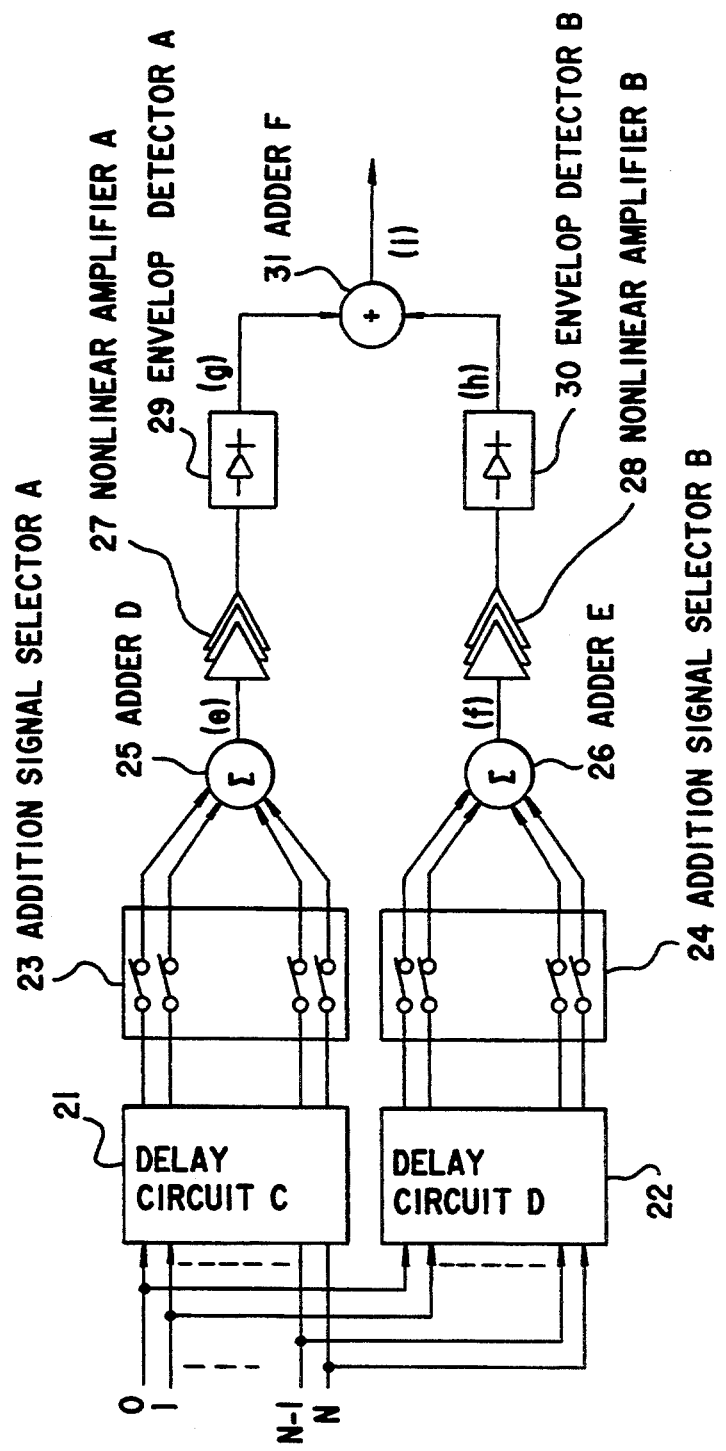
FIG. 1 is a block diagram of an echo beam former in a first embodiment according to the present invention.
Figure 6:
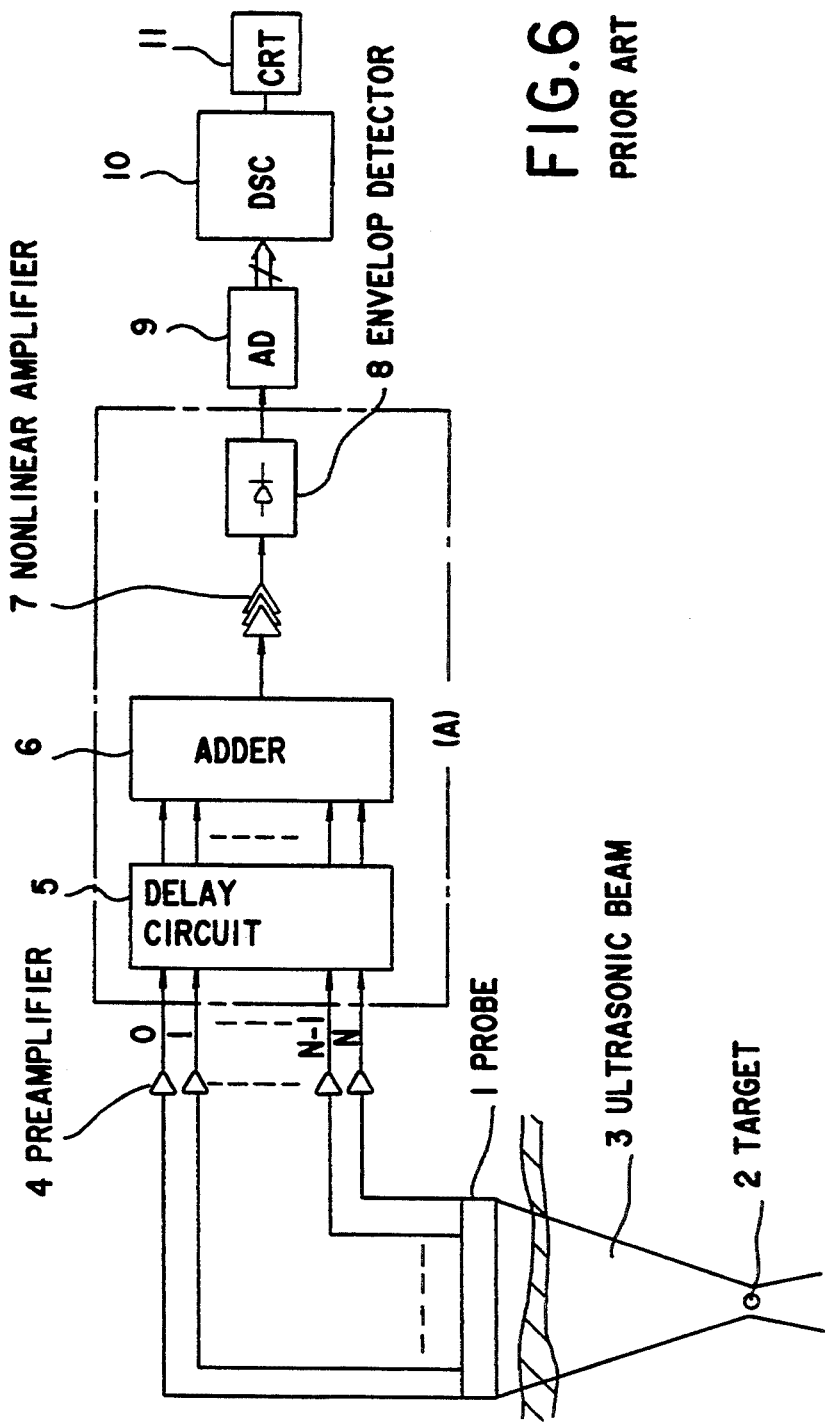
FIG. 6 is an ultrasonic diagnostic apparatus provided with a conventional echo beam former.

FIG. 1 is a block diagram of an echo beam former in a first embodiment according to the present invention. The block (A) in the ultrasonic diagnostic apparatus shown in FIG. 6 is substituted by the block diagram of FIG. 1. In FIG. 1, indicated at 21 and 22 are a delay circuit C and a delay circuit D which receive N signals of all the channels of the aperture of a probe 1 simultaneously and delay the signal of each channel by a definite delay time.

An addition signal selector A 23 receives the output signals of the delay circuit C 21, closes switches for a plurality of specified channels to pass only the signals of the specified channels, an addition signal selector B receives the output signals of the delay circuit D 22 and closes switches for a plurality of specified channels to pass the signals of the specified channels.

An adder D 25 adds up the signals of the specified channels selected by the addition signal selector A for the phasing addition of the specified channels and an adder E 26 adds up the signals of the specified channels selected by the addition signal selector B for the phasing addition of the specified channels.

Indicated at 27 and 28 are nonlinear amplifiers A and B respectively for the nonlinear compression and amplification of the output signals of the adder D 25 and the adder E 26, and indicated at 29 and 30 are an envelop detector A and an envelop detector B respectively for the envelop detection of the output signals of the nonlinear amplifier A 27 and the nonlinear amplifier B 28.

Indicated at 31 is an adder F for adding up the signals detected by the envelop detector A 29 and the envelop detector B 30. The output signals of the adder F is transmitted through the A/D converter 9 and DSC 10 of FIG. 6 to the CRT 11, and then the CRT 11 displays a picture represented by the output signals of the adder F.

The principle of operation of the echo beam former in this embodiment will be described prior to the description of the operation of the same echo beam former.

Figure 8A:
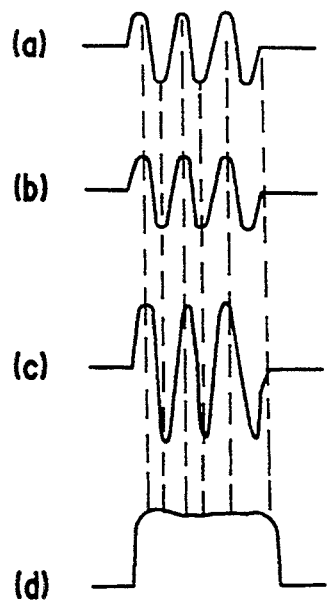
FIGS. 8(A) and 8(B) are diagrams showing the relation between echo signals provided by the conventional echo beam former and detection output when the distribution of sonic velocity is uniform and when the distribution of sonic velocity is irregular, respectively.
Figure 8B:
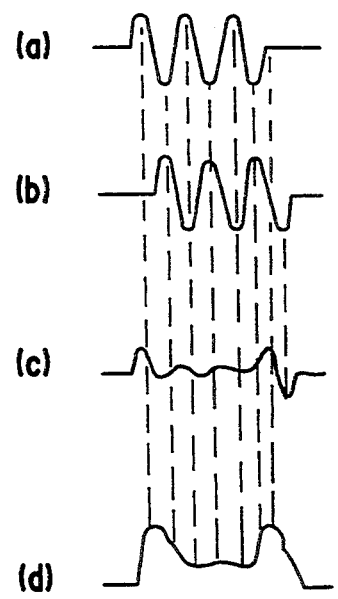

Irregular distribution of sonic velocity in an organism is an inevitable accompaniment to the organism. Therefore, the wave front of ultrasonic waves is deformed due to irregular sonic velocity distribution. If the signals having high frequencies (RF) susceptible to the deformed wave front, provided by all the elements of a large aperture are added up, a phased and added signal representing a correct waveform as shown in FIG. 8(A) cannot be obtained. On the other hand, the deformation of the wave front of a signal received by a probe having a small aperture is small because the degree of irregularity in sonic velocity distribution within the aperture is small and the influence of irregular sonic velocity distribution on the output of the beam former can be reduced. The present invention uses such a favorable fact and selects proper echo signals by the addition signal selectors to receive echo signals in a mode equivalent to that in which a small aperture receives echo signal in respect of the influence of irregular sonic velocity distribution.

Figure 3A:
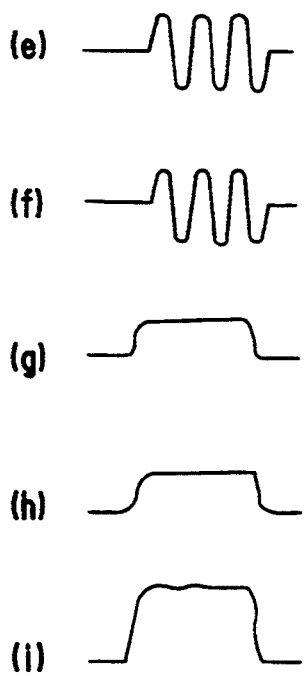
FIGS. 3(A) and 3(B) are views showing the relation between echo signals and detection output when the distribution of sonic velocity is uniform and when the distribution of sonic velocity is irregular, respectively.
Figure 3B:
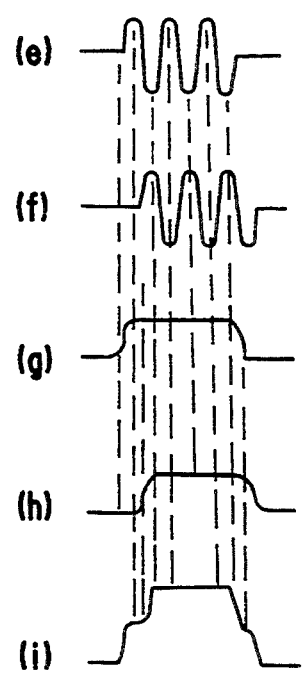
Figure 7:
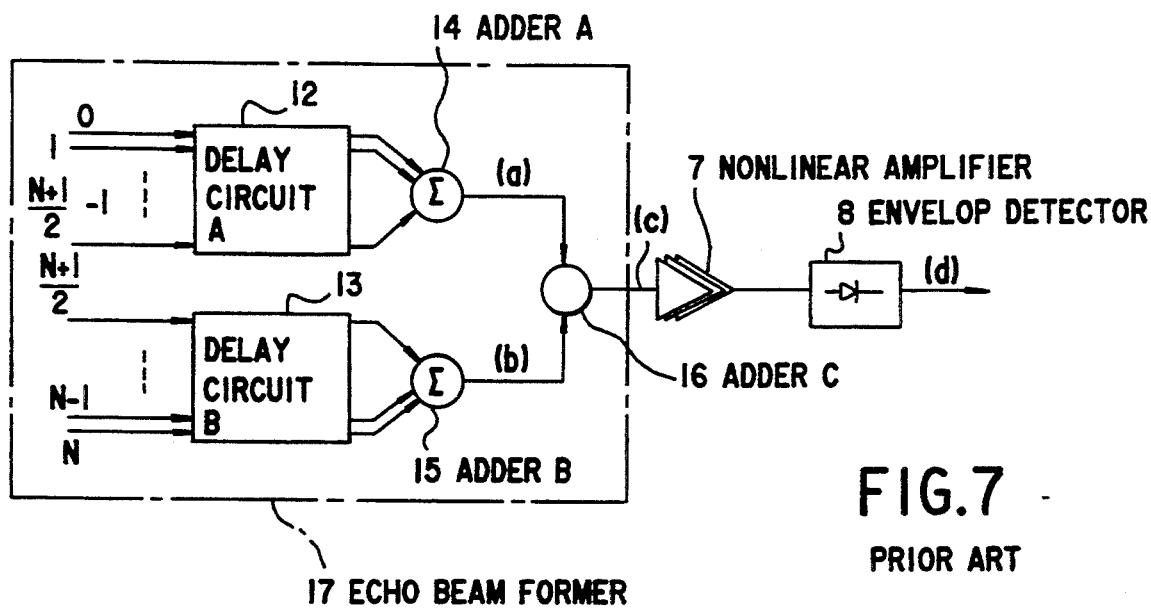
FIG. 7 is a circuit from an echo beam former to an envelop detector included in the ultrasonic diagnostic apparatus of FIG. 6.

In contrast to the conventional art of FIG. 7, advantageously, the invention employs the addition signal selectors 23, 24, which are located in front of the adders 25,26, and also, in front of the adder 31, the non-linear amplifiers 27,28, and the envelope detectors 29,30. In the circuit of FIG. 7, the non-linear amplifier and envelope detector are located after (not before) the adder that combines the two parallel added signals. By combining the foregoing feature of the unique placement of the non-linear amplifiers and the envelope detectors before the adder 31, and by using the addition signal selectors, the resulting waveforms shown in FIGS. 3(A) and 3(B) are obtained. That is to say, the objects of the invention are attained thereby.

Figure 2:
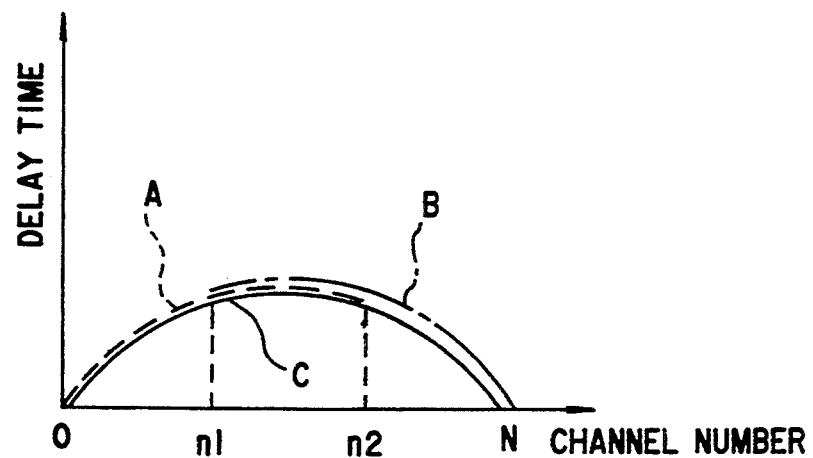
FIG. 2 is a diagrammatic view of assistance in explaining a manner of dividing the aperture of a probe included in the echo beam former of FIG. 1.

Referring to FIG. 2 showing the relation between channels and delay time when focusing echoes at a depth by delaying the signals of each channel by the delay circuit, the aperture has N+1 channels, i.e., a channel No. 0 to a channel No. N, and the aperture is divided into three partial apertures, i.e., a first partial aperture including the channel No. 0 to the channel No. n1, a second partial aperture including the channel No. n1 to the channel No. n2, and a third partial aperture including the channel No. n2 to the channel No. N. In FIG. 2, a curve C indicates the range of channels to be phased and added by the conventional echo beam former and the distribution of delay time, in which all the channels of the aperture is included in the range. Curves A and B indicate, by way of example, the ranges of channels to be phased and added by the echo beam former in this embodiment and the distribution of delay time. The curve A indicates the range of channels to be selected by the addition signal selector A 23 among those of the signals delayed by the delay circuit C 21, and the curve B indicates the range of channels to be selected by the addition signal selector B 24 among those of the signals delayed by the delay circuit D 22.

In this embodiment, the adder D 25 adds up the signals of the channels No. 0 to No. n2 in the range indicated by the curve A in FIG. 2, the adder E 28 adds up the signals of the channel No. n1 to the channel No. N indicated by the curve B in FIG. 2, the results of addition provided by the adders D 25 and E 28 are detected individually, and the detected signals are added up to obtain an output signal equivalent in respect of the influence of irregular sonic velocity distribution to an output obtained by processing echo signals received by a small aperture.

The operation of the embodiment shown in FIG. 1 will be described hereinafter. The delay circuit C 21 delays the input signals of all the channels by a given delay time and gives the delayed signals to the addition signal selector A 23. The addition signal selector A 23 closes switches to pass the signals of the channels Nos. 0 to n2 in the range indicated by the curve A. The adder D 25 adds up the signals of the channels Nos. 0 to n2 for phasing and addition.

The delay circuit D 22 delays the input signals of all the channels by a given delay time in a manner similar to that in which the delay circuit C 21 delays the input signals and gives the delayed signals to the addition signal selector B 24. The addition signal selector B 24 closes switches to pass the signals of the channels Nos. n1 to N in the range indicated by the curve B. The adder E 26 adds up the signals of the channels Nos. n1 to N for phasing and addition.

The nonlinear amplifier A 27 amplifies the output signal of the adder D 25, and the envelop detector A 29 detects the output of the nonlinear amplifier A 27 for envelop detection. Similarly, the nonlinear amplifier B 28 amplifies the output signal of the adder E 26 and the envelop detector B 30 detects the output signal of the nonlinear amplifier B 28 for envelop detection. The adder F 31 add up the two output signals of the envelop detectors A 29 and B 30 and gives a phased and added output signal to the next circuit.

FIGS. 3(A) and 3(B) show waveforms of the signals when the signals of the channels Nos. 0 to n2 and those of the channels Nos. n1 to N selected respectively by the addition signal selectors A 23 and B 24 are subjected separately to phasing and addition by using the echo beam former in this embodiment instead of the block (A) shown in FIG. 6, when receiving echo signals from the target 2. FIG. 3(A) shows the waveforms of the signals when the distribution of sonic velocity is uniform and FIG. 3(B) shows the waveforms of the signals when sonic velocity distribution is irregular, in which the phase difference between the RF signals of the two systems is 180°. In each of FIGS. 3(A) and 3(B), e is the output signal of the adder D 25 for the aperture A, f is the output signal of the adder E 26 for the aperture B, g is the output signal of the envelope detector A 29, h is the output signal of the envelope detector B 30, and i is the output signal of the adder F 31 obtained by composing the signals g and h. In FIGS. 3(A) and 3(B), it is supposed that the apertures respectively including the channels Nos. 0 to n2 and the channels Nos. n1 to N are so small, as the aperture of a probe, that the degree of irregularity of sonic velocity distribution within the apertures is negligibly small.

As is obvious from the waveforms shown in FIG. 3(A), the output signals e and f of the adders D 25 and E 26 obtained by phasing and adding the output signals of the apertures A and B shown in FIG. 2 are in phase and, consequently, the output signal i of the adder 31 obtained by composing the signals e and f is the reproduction of information represented by the signals e and f.

When the phase difference between the signals e and f is 180° as shown in FIG. 3(B), the signal g obtained through the envelop detection of the signal e, and the signal h obtained through the envelop detection of the signal f represent the information represented by the signal e and the information represented by the signal f, respectively. The signal i obtained by composing the signals g and h is the substantially correct reproduction of information about the target and shows that the signals e and f do not cancel each other.

The determination of the channels Nos. n1 and n2 demarcating regions to which the apertures A and B (FIG. 2) are assigned, namely, conditions for the determination of the ranges for the selection of channels by the addition signal selector A 23 and B 24 will be examined. The smaller the width of the partial apertures A and B, the less is the adverse influence of irregular sonic velocity distribution on echo beam forming and lower is the azimuth resolution. Thus, the reduction of the adverse influence of irregular sonic velocity distribution on echo beam forming and the enhancement of azimuth resolution run in antinomy. Therefore, as shown in FIG. 2, the partial apertures A and B are determined so as to overlap each other in a range between the channels Nos. n1 and n2 in order that an acceptable azimuth resolution can be secured. The channels Nos. n1 and n2 are dependent on to which of the reduction of the adverse influence of irregular sonic velocity distribution on echo beam forming and the enhancement of azimuth resolution is given priority.

Figure 4:
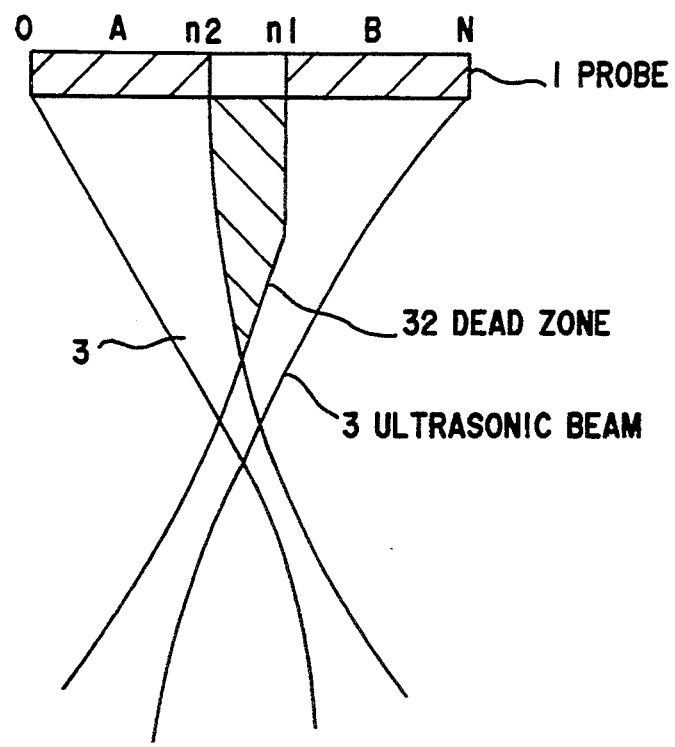
FIG. 4 is a diagrammatic view of assistance in explaining a region to which any ultrasonic beam is not applied when there are channels not participating in receiving echoes in dividing channels.

However, if n1>n2, channels between the channels Nos. n1 and n2 do not participate in receiving echoes and a dead zone 32 is formed as shown in FIG. 4. Therefore, $0 < n1 \leq n2$ is the necessary condition.

As is apparent from the foregoing description, the echo beam former in the first embodiment is capable of echo beam forming unaffected by irregular sonic velocity distribution even if echoes are received by a probe having a large aperture.

The present invention is not limited to the foregoing embodiment. The channels Nos. n1 and n2 need not be fixed; the channels Nos. n1 and n2 may be changed according to the depth of echo signals to form a variable aperture. Although the delay circuit C 21 and D 22 receive the signals of all the channels, the delay circuit C 21 need not give the signals of channels beyond n2 channels, i.e., a maximum number of channels, to the addition signal selector A 23, which applies also to the delay circuit D 22.

Figure 5:
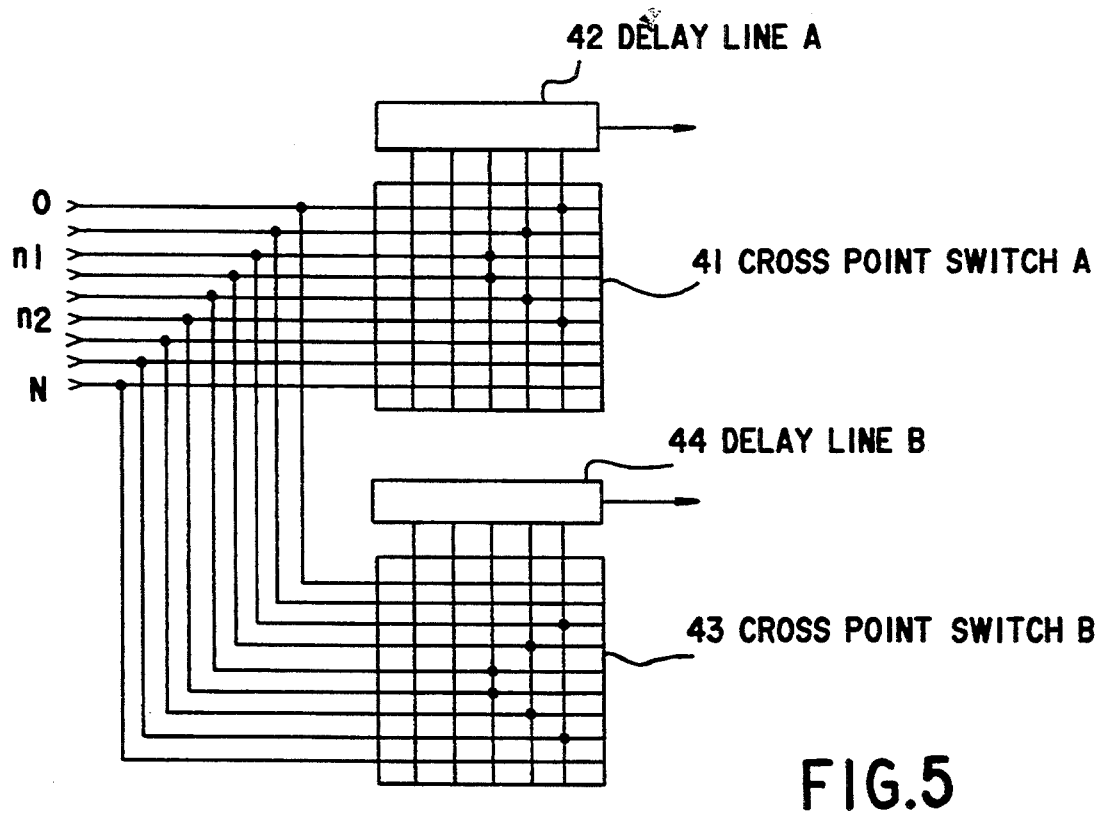
FIG. 5 is a diagrammatic view of assistance in explaining an echo beam former in a second embodiment according to the present invention.

FIG. 5 shows part of an echo beam former in a second embodiment according to the present invention. In FIG. 5, indicated at 41 is a cross-point switch for selectively applying the signals of channels Nos. 0 to n2 to desired taps of a delay line A 42, and at 43 is a cross-point switch for selectively applying the signals of channels Nos. n1 to N to desired taps of a delay line B 44. The delay circuit C 21, the delay circuit D 22, the addition signal selector A 23 and the addition signal selector B 24 of the echo beam former shown in FIG. 1 may be substituted by the circuit shown in FIG. 5.

The channels of the aperture need not be divided into those of two partial apertures as shown in FIG. 1; the channels may be divided into those of more than two and not greater than N partial apertures.

We claim:

1. A beam forming device for use in an ultrasonic diagnostic apparatus having a probe means for transmitting ultrasonic signals to a target and for receiving ultrasonic signals reflected from the target, said device comprising, in combination:

a pair of delay means (21,22) for receiving signals of channels 0 through N, from said probe means and for delaying said signals of each channel;

a first addition signal selector means (23) connected to one of said pair of delay means for selecting signals of channels 0 through n2;

a second addition signal selector means (24) connected to the other of said pair of delay means for selecting signals of channels n1 through N, wherein n1 is smaller than n2;

a pair of first adder means (25,26) connected respectively to said first and second addition signal selector means for respectively adding the phases of output signals in selected channels 0 through n2, and n1 through N from said first and second addition signal selector means;

a pair of non-linear amplifier means (27,28) connected respectively to said pair of first adder means for non-linear compression and amplification of respective output signals from said pair of first adder means;

a pair of envelope detector means (29,30) connected respectively to said pair of non-linear amplifier means for detecting respective envelopes of output signals from said pair of non-linear amplifiers;

a second adder means (31) for adding together output signals from said pair of envelope detector means; and means (9,10,11) for displaying said target as represented by output signals from said second adder means.

* * * * *